United States Patent [19]

Helferich

[11] Patent Number: 4,864,301

[45] Date of Patent: Sep. 5, 1989

[54] VARIABLE SPEED TRANSMISSION RECORDING AND RETRIEVAL OF DATA

[75] Inventor: Richard J. Helferich, Westlake Village, Calif.

[73] Assignees: Richard J. Helferich, Newbury Park; Martin A. Schwartz, Tarzana, both of Calif.

[21] Appl. No.: 110,201

[22] Filed: Oct. 19, 1987

Related U.S. Application Data

[63] Continuation-in-part of Ser. No. 77,496, Jul. 24, 1987.

[51] Int. Cl.$^4$ .............................................. H03M 1/02
[52] U.S. Cl. .................................. 347/110; 364/179; 341/60; 341/143
[58] Field of Search ...... 340/347 SH, 347 R, 347 CC, 340/347 AD, 347 DA, 347 C, 347 M; 364/178, 179; 341/60, 108, 110, 115, 123, 124, 127, 143, 161

[56] References Cited

U.S. PATENT DOCUMENTS

| | | | |
|---|---|---|---|
| 3,073,896 | 1/1963 | James ..................... | 178/6 |
| 3,219,934 | 11/1965 | Kalfaian ................. | 328/15 |
| 3,349,184 | 10/1967 | Morgan .................. | 179/15.55 |
| 3,437,760 | 4/1969 | Kawashima ............. | 179/15 |
| 3,466,392 | 9/1969 | Calfee et al. ............ | 178/66 |
| 3,470,472 | 9/1969 | Suzuki et al. ........... | 325/18 |
| 3,651,413 | 3/1972 | Wycoff ................... | 325/492 |
| 3,654,560 | 4/1972 | Cath et al. .............. | 328/127 |
| 3,659,048 | 4/1972 | Zuerblis et al. ......... | 178/66 A |
| 3,662,380 | 5/1972 | Cargile ................... | 340/347 AD |
| 3,716,848 | 2/1973 | Schonholtz et al. ..... | 340/311 |
| 3,731,279 | 5/1973 | Halsall et al. .......... | 340/172.5 |
| 3,740,488 | 6/1973 | Linfield et al. ......... | 179/82 |
| 3,783,384 | 1/1974 | Wycoff ................... | 325/55 |
| 3,909,811 | 9/1975 | Adler ..................... | 340/189 |

(List continued on next page.)

OTHER PUBLICATIONS

The Engineering Staff of Analog Devices, Inc., Analog-Digital Conversion Handbook, 6/1972, pp. L-84, to I-108.

The Engineering Staff of Analog Devices, Inc., Analog-Digital Conversion Handbook, Jun. 1972, pp. I-2&3; I-841 to 109;. II-46 to II-53.

Z. H. Meiksin and Philip C. Thackray, Electronic Design with Off-the Shelf Integrated Circuits, Parker Publishing Company, Inc., 1980, pp. 170-172.

Advertisement for "Shinwa," distributed by ICM Communications, Radio Communications Report, vol. 6, No. 8, Apr. 15, 1987, pp. 28; "Mobile and Pager", pp. 37-38.

Advertisement for "Two Tone, Tone and Voice Pagers", distributed by ICM Communications, Radio Communications Report, Oct. 16, 1988, p. 15.

Primary Examiner—William M. Shoop, Jr.
Assistant Examiner—Gary J. Romano
Attorney, Agent, or Firm—Knobbe, Martens, Olson & Bear

[57] ABSTRACT

An analog communication system includes a transmitter and at least one remote receiver for receiving an incoming signal carrying an analog component from a suitable transmitter. The transmitter and receiver are provided with circuitry for transmitting, receiving and recording and for playback of the analog componant of the transmitted signal at different rates. The system is adapted to transmit along messages at a high rate to conserve transmission time and to record and playback the message at a slower audible rate. The system circuitry includes a decoder which may be programmed to recognize an address code specific to a particular receiver or group of receivers or may be activated simply by the incoming signal without an address code, to emit the enable signal. The decoder includes rate memory for storing record and playback rates in memory sectors corresponding to the memory sector of RAM in which the message is stored. The system further includes circuitry for converting the analog conponent of the signal to digital format to conserve memory and for reconverting a digital signal to analog format for playback in analog format.

20 Claims, 5 Drawing Sheets

U.S. PATENT DOCUMENTS

| | | | |
|---|---|---|---|
| 3,936,610 | 2/1976 | Schiffman | 179/15.55 T |
| 3,947,832 | 3/1976 | Rosgen et al. | 340/224 |
| 3,950,607 | 4/1976 | Southworth et al. | 178/6 |
| 3,958,235 | 5/1976 | Duffy | 340/366 |
| 4,042,906 | 8/1977 | Ezell | 340/15.5 TS |
| 4,124,773 | 11/1978 | Elkins | 179/2 A |
| 4,181,893 | 1/1980 | Ehmke | 325/492 |
| 4,233,500 | 11/1980 | Cordill | 235/310 |
| 4,264,898 | 4/1981 | Barman et al. | 340/347 NT |
| 4,356,519 | 10/1982 | Cogdell, Jr. | 360/61 |
| 4,371,752 | 2/1983 | Matthews et al. | 179/7.1 TP |
| 4,408,099 | 10/1983 | Ishii | 179/2 EC |
| 4,443,787 | 4/1984 | Denk et al. | 340/347 P |
| 4,468,813 | 8/1984 | Burke et al. | 455/38 |
| 4,479,124 | 10/1984 | Rodriguez et al. | 340/825.44 |
| 4,495,647 | 1/1985 | Burke et al. | 455/38 |
| 4,499,567 | 2/1985 | Armstrong | 369/7 |
| 4,518,827 | 5/1985 | Sagara | 179/81 R |
| 4,549,047 | 10/1985 | Brian et al. | 179/18 B |
| 4,573,140 | 2/1986 | Szeto | 364/900 |
| 4,602,129 | 7/1986 | Matthews et al. | 179/18 B |
| 4,640,991 | 2/1987 | Matthews et al. | 379/88 |
| 4,652,857 | 3/1987 | Meiksin | 340/347 R |
| 4,673,916 | 6/1987 | Kitamura et al. | 340/347 SH |
| 4,695,825 | 9/1987 | Bloy et al. | 340/347 SH |
| 4,763,207 | 8/1988 | Podalak et al. | 341/123 |
| 4,772,873 | 9/1988 | Duncan | 341/110 |

VARIABLE SPEED TRANSMISSION RECORDING AND RETRIEVAL OF DATA

CROSS REFERENCE TO RELATED APPLICATIONS

This is a continuation-in-part of application Ser. No. 07/077,496 entitled ANALOG/DIGITAL STORAGE SYSTEM, filed July 24, 1987.

FIELD OF THE INVENTION

The present invention relates to communication systems and more particularly to communication systems involving the transmission of data at one speed and the reception and playback of the transmitted data at a different speed.

BACKGROUND OF THE INVENTION

In the communications field, particularly in radio communications, transmission time is desirably maintained at a minimum. In radio communication, the available channels are crowded and there is great competition for air time. For this reason most paging systems involve the transmission of messages in digital format because the digital format requires less time to transmit. The messages received, however, are limited to short written messages which are displayed on a small LED or LCD display screen and the messages are normally limited to the type that require the subscriber to go to a telephone and call the message originator. In addition to the limited message capability of such systems, the transmitting components are expensive, normally requiring centralized computer message facilities to transmit the digital data and to store the analog messages for the subscribers.

Accordingly, it would be highly desirable to provide a system for transmitting analog messages directly to a remote unit in which the analog messages are transmitted at a high rate of speed to conserve air time and are received and recorded at the remote unit for playback at a slower rate of speed to return the message to its audible condition. As a corollary, it would also be desirable to transmit certain analog data at a slow rate of speed and to play the message back at a higher rate of speed, again to return it to its audible format. Such a transmission procedure is beneficially carried out in the transmission of music and other high fidelity analog data over telephone lines which normally adversely affect the fidelity of the data being transmitted. In such a case it would be desirable to transmit the data at a slow rate of speed thereby to retain the fidelity and to play it back at its normal rate of speed without loss of fidelity.

SUMMARY OF THE INVENTION

In accordance with the present invention there is provided a communications system for the transmission of analog data at a first rate and the storage and playback of the message at a second rate. The system comprises transmitter means which includes a transmission buffer which communicates with a control terminal for the input of the data and with a transmitter for sending the analog message. The system further includes a receiver group including a receiver compatible with the transmitter for receiving the transmitted signal and which includes circuitry for storing the received signal in memory and for retrieving the signal from memory and converting it to usable format. It will be understood that signal rate conversion can occur prior to storing the signal in memory or subsequent to the signal retrieval from memory but prior to playback. Also, the signal may be transmitted at one rate, recorded at a second rate and played back at yet a third rate. Preferably, the encoding means at the transmitter buffer also encodes an address and speech code which can be recognized by the receiver group so that messages can be sent to specific receivers at various transmitter rates.

The system of the present invention is readily adaptable for use with wire communication systems such as single and multi-line telephone systems, and intercom systems as well as for radio communication. The system is particularly useful for paging systems and telemetry systems as well as for systems for transmitting music and other data where high fidelity is required. The system of the invention employs circuitry that is readily installed with conventional transmission and receiving equipment, such as commercially available paging equipment.

BRIEF DESCRIPTION OF THE DRAWINGS

The invention will be best understood in conjunction with the following description when taken with the accompanying drawings in which.

DESCRIPTION OF THE INVENTION

Figure 1:
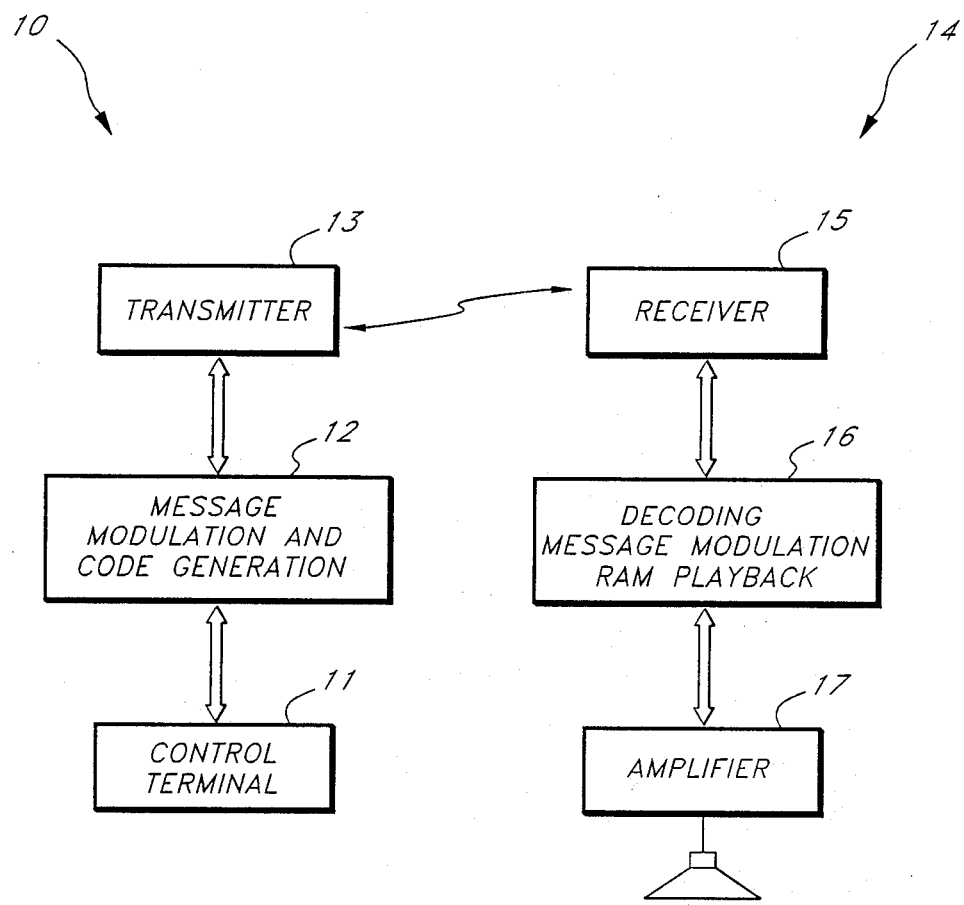
FIG. 1 is a block diagram of an analog message paging system incorporating the variable rate transmission and playback feature of the present invention.

Referring to FIG. 1, there is illustrated an analog communications system for the transmission of data in analog form at one rate for reception and playback of the message at a different rate. The system includes a transmitter group 10 consisting of a control terminal 11 for the input of data including address data and message transmission rate data, message modulation and code generation means 12 and transmitter means 13. The data is input from the control terminal 11 to the message modulation and code generation means 12 where the input message is stored temporarily, the address and speed rate code data generated and the analog message modulated to the selected transmission rate. A transmission packet consisting of the modulated analog message and preceded by an address code and code for controlling the storage and playback rates of the message are sent to the transmitter means 13 for transmission. The transmitter means 13 may be wireless such as, for example, transmission at radio frequency, infrared, or visible frequencies or hard wired, such as by telephone.

The transmitted data is captured by a receiver group 14 which includes receiver means 15 capable of receiving the signal from the transmitter means 13. The signal as received is conveyed to decoding and modulation means 16 including means for processing the record and playback rate codes after the transmitted address code is compared with a preprogrammed address code. If the transmitted address code data matches the preset address code of the receiver group 14, the rate code is input into a rate memory for subsequent control of the record and reproduction rates. The receiver group 14 further includes amplifier and speaker means 17 for the playback of recorded data.

The coding, decoding and signal modulation including message rate conversion functions for both the transmitter group 10 and the receiver group 14 are the same except that the signal input and the control commands for the transmitter group is derived from the control terminal 11 while the signal input for the receiver group is derived from the receiver 15 and the control commands from the circuitry of the decoding and modulation means 16. The encoding and decoding circuitry of both the transmitter group 10 and the receiver group 14 are of conventional design and do not per se form a part of this invention. Thus, various code generators such as, for example, digital code generators, tone code or dual-tone multifrequency (DTMF) code generators are used with good results. It is critical only that the decoder circuitry of the receiver group 14 be compatible with the code generator circuitry of the transmitter group 10. As mentioned, the transmitted code may include an address which is input from the control terminal 11 so that the message is received and stored at a particular designated receiver group 14. However, the use of an address code with the transmitted signal is not critical and the receiver groups 14 can function with simply voice actuated devices which activate the record circuitry of the receiver group 14 as will be described in more detail hereinafter.

Figure 2:
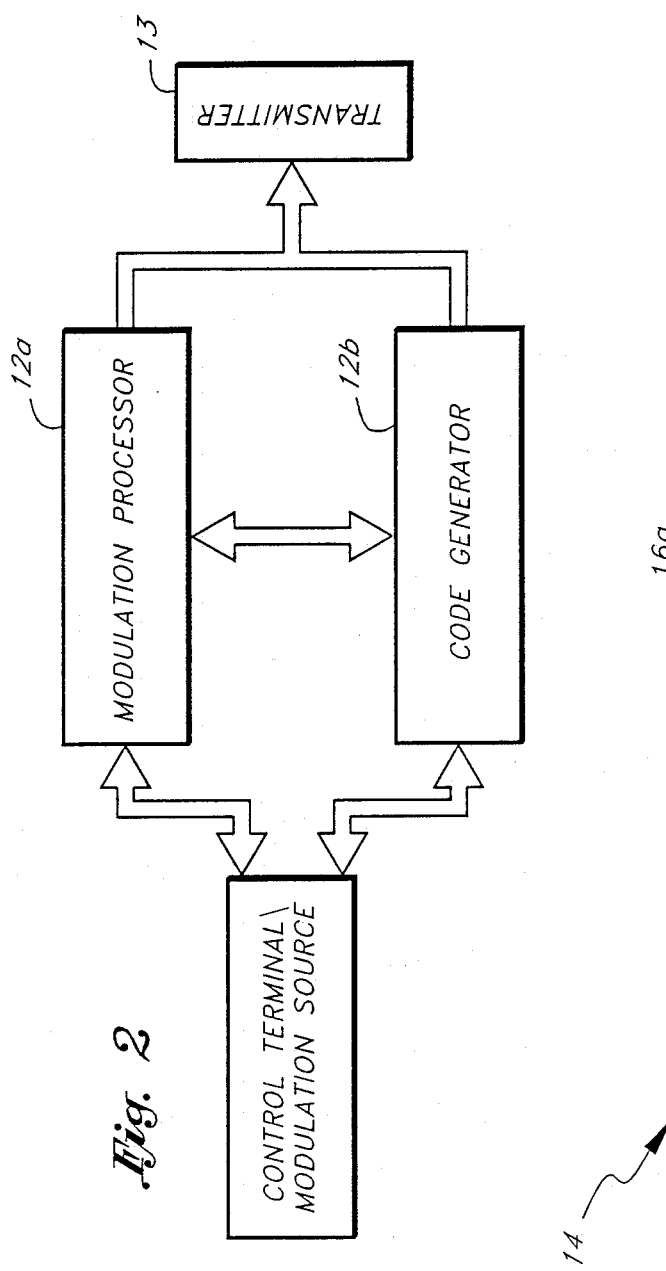
FIG. 2 is a block diagram of the transmission group in accordance with the present invention.

The operation of the transmitter group 10 is best understood in conjunction with FIG. 2 in which the message modulation and code generation circuitry 12 is shown schematically as comprising circuitry for a message modulation processor 12a and a code generator 12b. The control terminal 11, which may be a computer with a number of paging messages in queue, issues an analog message to the modulation processor 12a and the address and rate codes to the code generator 12b. The message is held in the modulation processor 12a while the code generator 12b generates the proper code for the record and playback rates and issues it to the transmitter for transmission. The control terminal 11 also issues a command to the modulation processor which determines the rate at which the analog message is transmitted and immediately following the transmission of the address and rate codes, the analog message is conveyed to the transmitter at the designated rate for transmission. Thus, the modulation processor 12a operates as a rate conversion circuit. As is shown most clearly in FIG. 3, the receiver group 14 receives the transmitted address code at the receiver 15 and conveys it to the decoder circuitry 16b which issues an activation command to the modulation processor 16a if the address codes match. The decoder circuitry 16b also sends a signal corresponding to the record play rate command to the modulation processor circuitry 16a for control of the record play rate. The transmitted analog message signal is conveyed to the modulation processor 16a from the receiver 15 where the data is preferably converted to digital format and stored in memory. Upon activation of a playback function by the receiver group operator, the playback rate command is issued by the decoder 16b in the manner to be described hereafter and the message is recalled from memory, reformatted into analog format and replayed at the command rate through the amplifier and speaker means 17. The decoder 16b may be preset to issue a fixed record and playback rate code such as is the case where messages are always transmitted at the same rate so that the record and playback rate can be fixed. However, for maximum flexibility it is preferred that the decoder 16b be adapted to issue different record and playback rate codes so that the same receiver group can receive, record and play back separate messages which have been transmitted at different rates.

Figure 4:
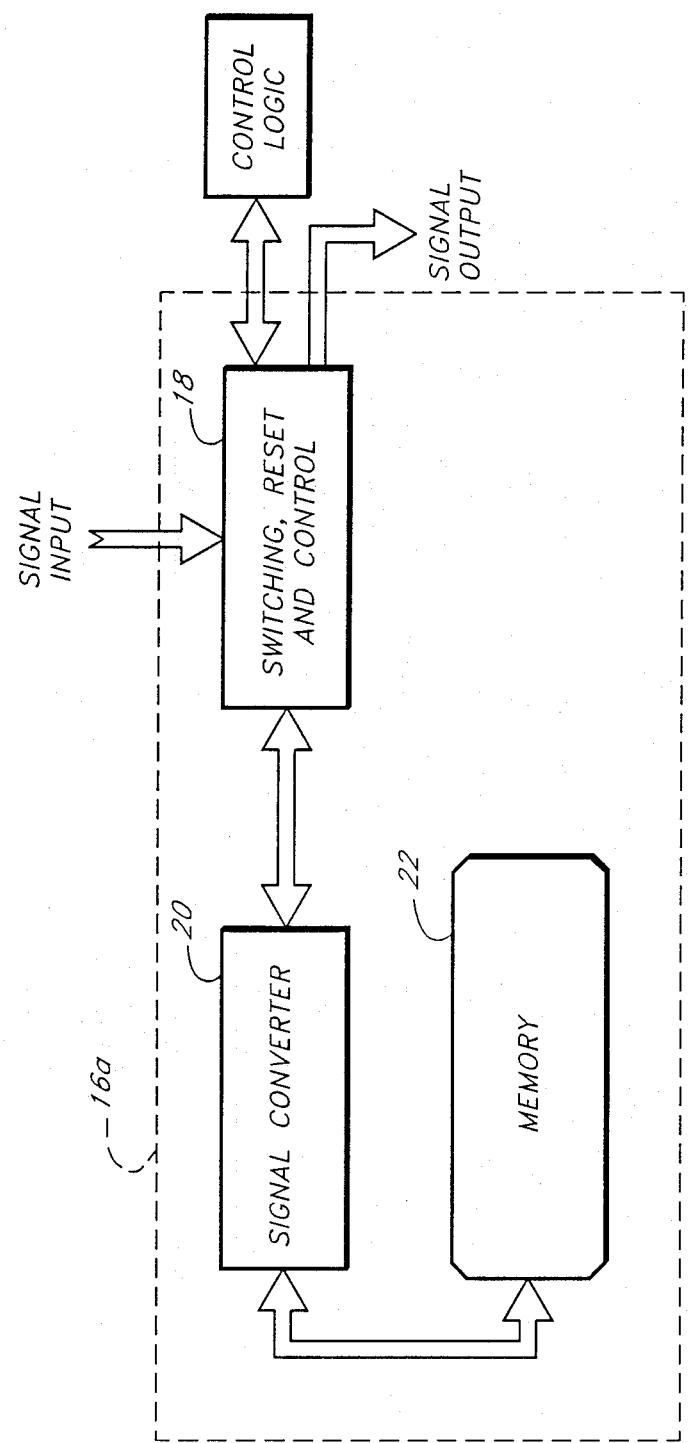
FIG. 4 block diagram of the modulation processor utilized by both the transmitter group and the receiver group.

The circuitry of the modulator processor 12a of the transmitter group 10 and the modulator processor 16a of the receiver group 14 is very similar and operates in substantially the same manner whether it is being used for transmitting or receiving. The circuitry essentially performs three functions; circuit control and switching, memory and signal conversion. As shown in FIG. 4, the modulation processor circuitry includes memory 22, control circuitry 18 for carrying out switching, reset and control functions responsive to control logic commands. Signal convertor circuitry 20 may be optionally included to convert data contained in the signal from analog to digital for storage and from digital to analog for transmission or playback.

Figure 5:
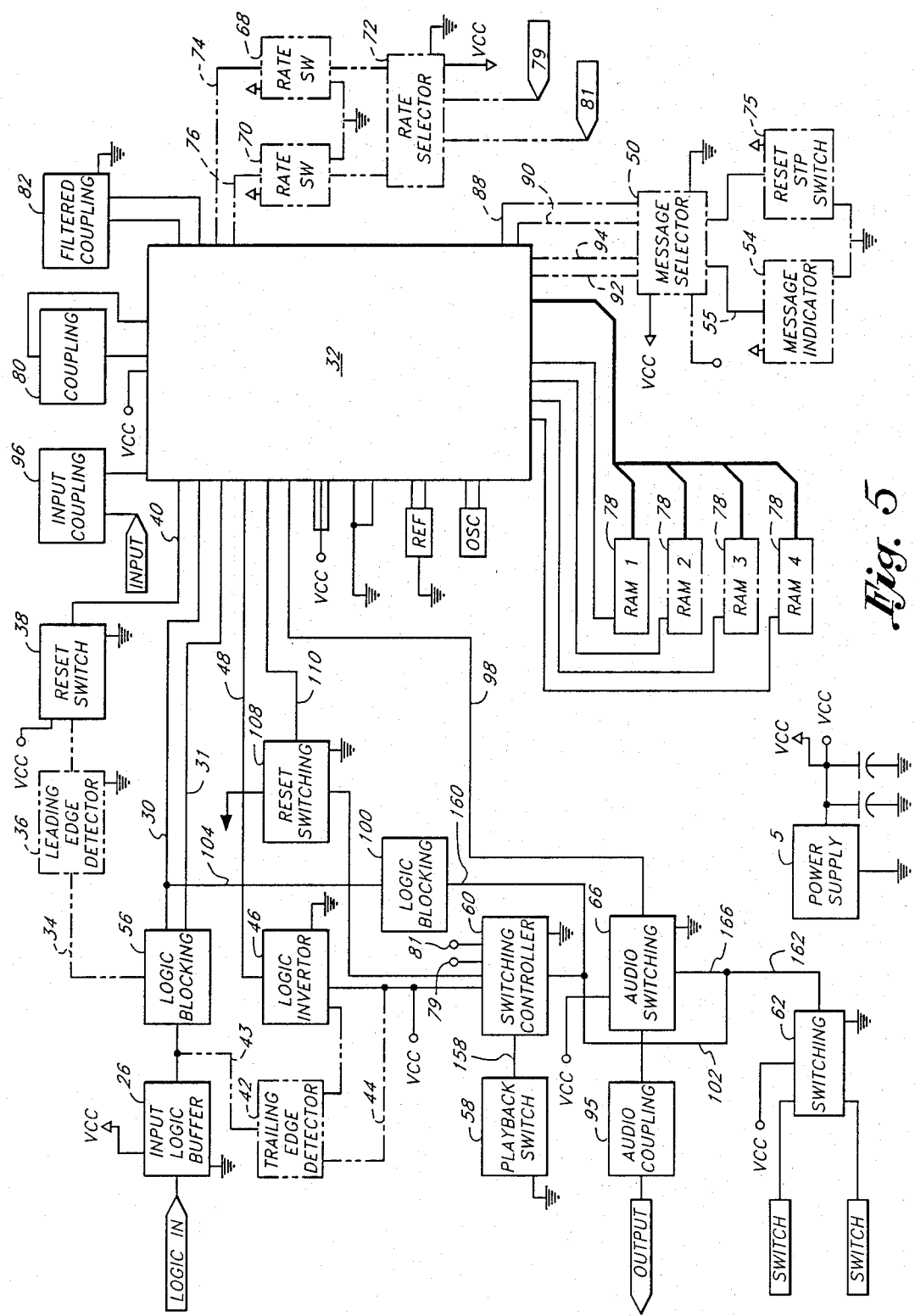
FIG. 5 is a block diagram of the circuitry of the modulation processor.
Figure 6:
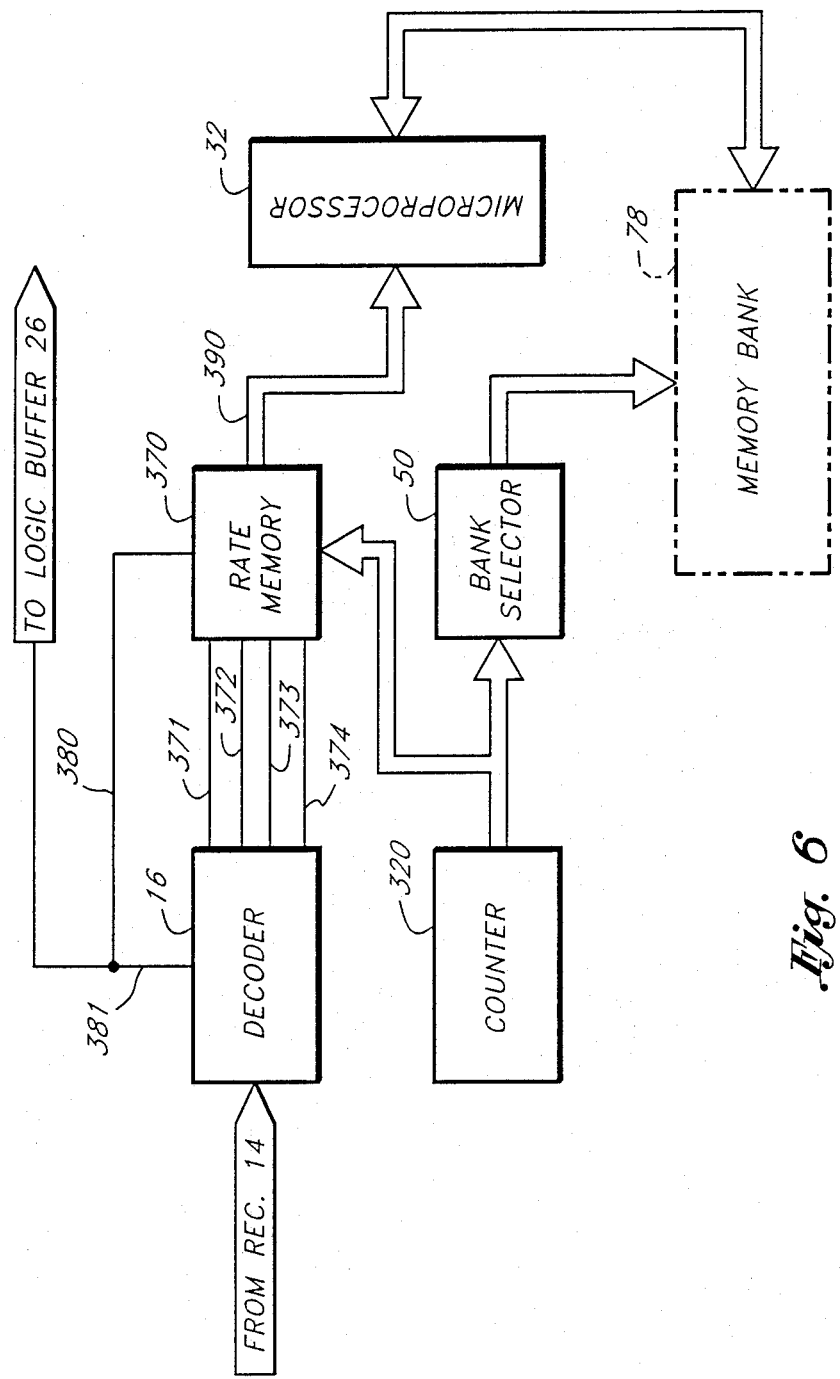
FIG. 6 is a block diagram of the receiver group decoder circuitry.

Referring now to FIGS. 5 and 6, there is shown a block diagram of the circuitry utilized in the control means 18, signal conversion means 20 and memory means 22 of the modulator processor circuitry 12a and 16a illustrated in FIGS. 2 and 4. The term audio will used throughout to designate the data being processed but it will be understood that the invention is not limited to the transmission of audio messages only and other data types and playback forms are used in the system as well.

As illustrated in FIG. 5 and FIG. 6, certain features which are present in the modulator processor circuitry 16a of the receiver group 14 and which are not utilized in the modulator processor circuitry 12a of the transmitter group 10 are shown in phantom. The following description of the modulator processor circuitry will be in connection with the modulation processor 16a of the receiver group 14. However, it will be understood that unless otherwise specified, the description will apply equally to the circuitry of the modulation processor 12a of the transmitter group 10.

A power supply 5 comprises any suitable source of power and preferably has a potential of at least 3 volts. Output from the decoder 16b to the control circuitry is through an input logic buffer 26 to a logic blocking circuit 56. The logic blocking circuit 56, which is of conventional diode design, distributes an enable signal (logic high) through a start line 30 and a record/play line 31 to a microprocessor 32. In the receiver group 14, if the decoder 16b is of the type that issues a continuous logic high during the duration of the incoming analog signal, it is highly preferred to include circuitry for automatically returning the circuits to the standby mode upon completion of the analog signal as indicated by a termination of the logic high. For this purpose, a trailing edge detector 42 is connected to a logic invertor 46 which in turn is connected to the microprocessor 32 through a stop line 48, the purpose and operation of which will be described in more detail hereinafter. In the case of the transmitter group 10 such circuitry is unnecessary since the control of the switching circuits is by the control terminal.

The incoming analog signal is input to the microprocessor 32 through an analog input coupling (audio coupling) 96 of conventional design. An audio switch 66 is connected to the microprocessor 32 by a line 98 for monitoring the analog signal during the record mode. For automatic resetting of the system to permit recording over messages already in memory, there may be included a leading edge detector 36 to which the logic high is conveyed from the logic blocking circuit 56 by means of a line 34. The leading edge detector 36 is of conventional design and is connected to the microprocessor 32 through a reset switch 38, and a reset line 40. A playback switch 58 is connected to a switching controller 60. The switching controller 60 consists of a pair of invertors which are coupled by resistors in a bi-stable (two stable states) circuit of conventional design whose output at lines 102 and 160 is normally low until inverted by activation of the switch 58 to initiate the playback mode. The output of the switching controller 60 remains high until it is inverted to its normal low by a reset switch 108. In the transmitter group 10, the function of the playback switch is taken over by the terminal controller 11.

It is highly preferred to store data in the memory 22 in digital form in order to conserve space. This particularly is the case for the receiver group 14, although conservation of memory space can be of great importance in the transmitter group 10 as well. Accordingly, in the discussion that follows, the modulator processor circuitry will be described as including the signal converter circuitry 20 although it is not critical to the operation of the modulation processor circuitry.

The digital to analog conversion and analog to digital reconversion is accomplished by the microprocessor 32. The microprocessor 32 is of conventional design, such as the microprocessor manufactured by Toshiba under the model number T6668, and is provided with circuitry for converting analog to digital and reconverting digital to analog. Such conversion circuits are well known in the art and operate by generating an internal time base, sampling the analog signal input at some predetermined point in each of the time base segments, and then generating a digital output responsive to the sample level obtained during the sampling period.

The microprocessor 32 is adapted for communication with random access memory which is illustrated as a bank of four 256k bit chips 78. It will be understood, however, that memory is not so limited and additional banks of RAM chips may be added as desired and as space permits. For example, the microprocessor 32 is readily adapted for communication with a random access memory 78 which consisting of one or more banks of 256k bit chips. Additional memory banks may be added as desired or needed, especially if the receiver operator intends to carry out a substantial amount of message recording, such as where the receiver group 14 is to be used as a note or memo storing unit.

The rate circuitry which enables the transmit, receive, record and playback messages at different clocking rates determined by the terminal 11 for the transmission group and by the decoded rate codes at the receiver group is most clearly shown in FIG. 5. The rate circuitry includes rate switches (inverters) 68 and 70 which are connected to the microprocessor 32 by lines 74 and 76 respectively. A rate selector 72 is operated by the output of the switching controller 60 at line 160 by lines 79 and 81 to control playback speed. In the modulation processor 12a of the transmitter group 10, the playback rate, which is the transmission rate, is under the control of the control terminal 11 and thus the invertors 68 and 70 and the rate selector 72 and the associated circuitry are not used.

In its standby configuration, the rate selector switch 72 is positioned to produce a low input and a high output at invertors 68 and 70 respectively so that both lines 74 and 76 are high. In this condition the microprocessor will record and playback at the same rate of speed, in this case 32K BPS. When the playback switch 58 is closed the high output from the switching controller 60 passes through the line 79 to the rate selector 72 which produces a high input at invertor 68. In this configuration the output of the invertor 68 is low causing line 74 to be low while the output at the invertor 70 is causing line 76 to be high. In this configuration the microprocessor will playback messages at a rate of 16K PBS. The BIT rate output is selected by 2 BIT codes so that 4 rates are selectable depending upon the positioning of the rate selector switch 72. The maximum rate in BPS is determined by the particular microprocessor employed in the system and in the embodiment described herein the maximum rate is 32K BPS. Upon completion of the message reproduction and playback, the microprocessor 32 sends a logic high through the line 110 to the reset switch 108. The reset switch 108 resets the switching controller 60 to its original condition returning its output to a logic low and which returns the switches 66 and 62 to the open position. At this point the system 10 is in the standby mode and ready to receive a new incoming signal for conversion and storage.

The decoder 16b may be preset to issue a fixed record and playback rate code such as is the case where messages are always transmitted at the same rate so that the record and playback rate can be fixed. However, for maximum flexibility it is preferred that the decoder 16b be adapted to issue different record and playback rate codes so that the same receiver group can receive, record and playback separate messages which have been transmitted at different rates.

In operation, the data to be transmitted is input to the memory 22 of the modulation processor 12b of the transmitter group 10 and held pending a transmit command. The transmit command includes an address code and rate code which are sent to the code generator 12b and then to the transmitter 13. Immediately following the rate codes and the transmit commands are sent to the microprocessor 32 and the message is retrieved from memory 22 and played back to the transmitter at the playback rate commanded. Where the signal converter circuitry 20 is employed to store the message data in memory in digitalized format, it will be understood the same circuitry is employed to reconvert the data to analog format before it is conveyed to the transmitter 13.

The analog message, audio or data, is transmitted by the transmitter 13 to the receiver 15 (FIG. 1). The message is preceded by a designated address code of any of the commonly used types such as tone, DTMF, digital, or the like and includes a playback rate code and may also include a length of message code. The analog signal received by the receiver 15 is transmitted to the decoder 16b which, if the proper designated code is present, or if the decoder 16b is a VOX circuit, emits an enable signal (logic high) through the input logic buffer 26 to the logic blocking circuit 56. In the embodiment of the invention described thus far the decoder 16b is of the type which emits a continuous logic high for the duration of the incoming analog signal. The logic high is conveyed through logic blocking circuit 56, the start line 30 and the record/playback line 31 to the microprocessor 32. In addition, the logic blocking circuit 56 conveys a logic high through the line 34 to the leading edge detector 36 which emits a pulse to close the reset switch 38. In the closed position, the reset switch 38 completes the circuit momentarily pulling the reset line 40 to a logic low to initialize the microprocessor 32 ad reset memory for receiving a new message. The incoming analog signal, which for purposes of illustration is described as an audio message, is transmitted to the analog to digital conversion circuit of the microprocessor 32 through the input audio coupling 96. After conversion of the analog signal to digital format the converted signal is then conveyed to the RAM 78 for storage in memory. When reception of the analog signal ceases, the decoder 14 terminates the logic high which activates the trailing edge detector 42 bringing it to a logic low. The logic low is indicated to the logic invertor 46 through the line 44 and the logic invertor inverts the low to a logic high which is conveyed through the stop line 48 to the microprocessor 32 to terminate the conversion and record process. Termination of the logic high also returns the start line 30 and the record/play line 31 to their original standby logic low condition placing the system 10 in a standby mode in which very little power is required.

To retrieve and playback a digital message stored in the RAM memory, the operator activates the playback switch 58 to cause the switching controller 60 to issue a logic high through the line 160, logic blocking circuit 100, the line 104 and the start line 30 to the microprocessor 32 to activate the playback reproducing function. At the same time the switching controller 60 outputs a logic high through the line 102 to simultaneously close the switches 62 and 66. The signal, which has been reconverted to analog format, is directed from the microprocessor 32 by the line 98 through the audio switch 66 and output audio coupler 95 to the amplifier means 17 (FIG. 1). In its standby configuration, the rate selector switch 72 is positioned to produce a low input and a high output at invertors 68 and 70 respectively so that both lines 74 and 76 are high. In this condition the microprocessor will record and playback at the same rate of speed, in this case 32K BPS. When the playback switch 58 is closed the high output from the switching controller 60 passes through the line 79 to the rate selector 72 which produces a high input at invertor 68. In this configuration the output of the invertor 68 is low causing line 74 to be low while the output at the invertor 70 is high causing line 76 to be high. In this configuration the microprocessor will playback messages at a rate of 16K BPS. The BIT rate output is selected by 2 BIT codes so that 4 rates are selectable depending upon the positioning of the rate selector switch 72. The maximum rate in BPS is determined by the particular microprocessor employed in the system and in the embodiment described herein the maximum rate is 32K BPS. Upon completion of the message reproduction and playback, the microprocessor 32 sends a logic high through the line 110 to the reset switch 108. The reset switch 108 resets the switching controller 60 to its original condition returning its output to a logic low and which returns the switches 66 and 62 to the open position. At this point the system 10 is in the standby mode and ready to receive a new incoming signal for conversion and storage.

Referring to FIG. 6 where like numbers refer to like parts, the decoder 16b is adapted for issuing a different record and playback rate codes for each individual message stored in memory by the provision of rate memory 370 with which the decoder 16b communicates by lines 371–374. The line 371 is the enable line which activates the rate memory 370 to receive the playback rate code output from the decoder 16b through the lines 373 and 374. The playback rate code is stored in a sector of the rate memory 370 designated by the counter 320 which also selects a corresponding sector of the RAM 78 in which to store the message. After the playback rate code is decoded and stored in the memory 370, the line 371 is disabled and the line 372 is enabled. The decoder 16b decodes the record speed rate and this command is coup-led to the record rate memory sector of the rate memory 370 through the lines 373 and 374. The line 372 is then disabled and a line 381 from decoder 16b is enabled. The line 381 activates the record circuitry of the system through the input logic buffer 26 which functions as described in connection with FIGS. 5. A line 380 couples the rate memory 370 to the enable line 381 for activation of the rate memory 370 to select the record speed from memory when the line 381 is enabled. The record speed code is conveyed from memory through a bus 390 to the rate input of the microprocessor 32. When the record command is issued by the decoder 16b as previously described, the line 381 is disabled.

For playback, the counter 320 selects the proper sector from the RAM 78 in the manner previously described along with the corresponding playback rate code from the rate memory 370. During playback the line 380 is disabled causing the rate memory 370 to produce the playback rate code which is conveyed through the line 390 to the rate circuitry of the microprocessor 32 for setting the playback rate.

The playback rate codes are stored in sectors of the rate memory 370 corresponding with the sector in RAM in which the message to which the code relates is stored. As mentioned the sectors are selected by the message selector 50 both of which serve the function of memory sector selection. In this fashion, stored messages are matched to corresponding playback rate codes so the message is played at the proper rate.

In the embodiment of the invention thus far described, it will be understood that there is no means for protecting a message in memory and upon receiving an incoming, properly addressed signal, the system is automatically reset and the incoming signal will be converted and stored over any message or data already in memory. The modulator processor 16a, however, is readily adapted for the storage of a sequence of messages in memory and protection of stored messages by selective reset circuitry or manual reset circuitry which must be activated to initiate the message record and conversion mode after memory is full of unplayed messages or data.

As shown in FIG. 5, the leading edge detector 36 is removed from the system 10 and the reset switch 38 is manually activated to reinitiate the microprocessor 32 in the manner already described to reset memory for recording over material already stored in memory. The system requires no further reset in order to record multiple messages until the respective memory bank is full, at which time a stop enable is generated within the microprocessor 32 and memory for that bank is protected until reset. As illustrated in FIG. 5, a memory address selector 50, which is a standard 4 BIT code counter circuit is connected to the microprocessor 32 making possible the selection of different 4 BIT address combinations per RAM 78. It will be understood, however, that other address selector circuits may be employed such as 2 BIT counter circuits or manual selectors, as are well known in the art. The message address selector 50 is connected to the start line 30 for receipt of the logic high from the logic blocking circuit 56.

A manual reset switch 75 is provided for resetting the message address to its initial address setting for the playback of messages stored in the memory. Playback of messages occurs in the manner already described except that with the leading edge detector 36 out of the circuit the reset switch 38 must be manually activated to discharge the reset line 40 in the manner already described to reset the microprocessor 32 for receiving new incoming analog signals and recording over messages already in RAM.

No memory address circuitry is required for the modulation processor 12b of the transmitter group since message storage is under the control of the control terminal 11.

In an alternative form of the invention, a timer 52 may be used in place of the trailing edge detector 42. The use of a timer is particularly required when the decoder 16b is of the type which emits a single pulse in response to a properly addressed incoming signal. As illustrated in FIG. 5, the trailing edge detector 42 and the line 44 are eliminated from the circuit and the timer, of conventional design, is connected to the line 43 for receiving the logic high from the input logic buffer 26. In operation, the timer 52 is initiated by the logic high and upon expiration of a preset period of time, issues a negative pulse to the logic invertor 46 which issues a logic high to the stop line 48 to place the system 10 in the standby mode in the manner already described.

As illustrated in FIG. 5, a message indicator 54 may be included to indicate the arrival of a signal and the indicator 54 may also be employed to indicate that memory space is full. The message indicator 54 maybe a light, LED or a device for creating an audible tone. Such devices are well known in the art and do not, per se, form a part of this invention.

The voice storage system as described herein will find application in medical recording, industrial monitoring, as an electronic note pad and the like in addition to paging systems. The ability to transmit and playback at different rates can effect substantial reductions in air time making analog message paging systems practical. In addition, data which must be transmitted over telephone lines may be transmitted at a slower rate to retain the fidelity of the message and later played back at its normal rate without loss of fidelity.

Having described the invention in connection with certain preferred embodiments thereof, it will be understood that many modifications and variations thereto are possible, all of which fall within the true spirit and scope of the invention.

Having described the invention I claim:

1. A digital voice storage communication system comprising:
    at least one transmitting station selectively addressing and sequentially transmitting at least one communication packet, each communication packet including an address code preceding rate code information and an analog voice message of variable length, comprising:
    a. a control terminal for controlling and forwarding said analog voice message and defining a predetermined rate of transmission;
    b. rate conversion circuitry responsive to said control terminal for shifting a normal speech rate of said analog voice message to said predetermined rate of transmission;
    c. code generating circuitry coupled to said rate conversion circuitry for generating said rate code information in said communication packet;
    d. transmitter circuitry connected to said rate conversion circuitry and said code generating circuitry for transmitting said communication packet at said predetermined rate of transmission;
    at least two receiving stations, each having a corresponding predetermined stored address, each comprising:
    e. receiver circuitry compatible with said transmitter circuitry for receiving said communication packet;
    f. decoder circuitry responsive to said receiver circuitry for comparing said predetermined stored address with said communication packet address code and for issuing a rate command;
    g. a digital memory for storing said analog voice message in response to said rate command issued by said decoder circuitry; and
    h. signal conversion circuitry for converting digital data in said digital memory into analog data for playback at a predetermined rate of playback responsive to said rate command and different from said predetermined rate of transmission.

2. The digital voice storage communication system as defined in claim 1, wherein said address code and said rate code information are transmitted immediately preceding said analog voice message in said communication packet, without a substantial delay.

3. The digital voice storage communication system as defined in claim 1, wherein said analog voice message is transmitted at a first rate of transmission, recorded in said digital memory of said receiver station at a second record rate and is played back at a third rate of playback.

4. The digital voice storage communication system as defined in claim 1, wherein said first rate of transmission is greater than said third rate of playback.

5. The digital voice storage communication system as defined in claim 1, wherein said first rate of transmission is slower than said third rate of playback.

6. The digital voice storage communication system as defined in claim 1, wherein said receiver station further comprises digital conversion circuitry for converting said analog voice message to digital format for storage in said digital memory.

7. The digital voice storage communication system as defined in claim 1, wherein said decoder circuitry of said receiver station further comprises a rate memory for storing said rate code information including a record rate code defining said second record rate and a playback rate code defining said third playback rate corresponding to each of a plurality of said analog voice messages, said rate memory communication with counter circuitry for monitoring said plurality of analog voice messages being recorded in said digital memory.

8. The digital voice storage communication system as defined in claim 7, wherein said record rate code defining a designated record rate is recalled from said rate memory of said decoder circuitry upon receipt of a corresponding analog voice message to enable said digital memory at said receiver station to record at said designated record rate.

9. The digital voice storage communication system as defined in claim 7, wherein said playback rate code defining a designated playback rate is recalled from said rate memory of said decoder circuitry upon activation of a playback switch of said receiver station to enable playback at said designated playback rate.

10. The digital voice storage communication system of claim 1, wherein said transmitting station sequentially transmits a plurality of said communication packets in a stacked, sequential order.

11. The digital voice storage communication system of claim 1, wherein said digital memory in said receiving station stores a plurality of said analog voice messages in said communication packets received from said transmitting station in a packed, sequential order.

12. The digital voice storage communication system of claim 7, wherein said digital memory when full, simultaneously initializes said counter circuitry, and enables said digital memory to first erase an oldest recorded of said plurality of analog voice messages, stacked sequentially in said digital memory.

13. The digital voice storage communication system of claim 7, wherein an operator initiated command replays first a last recorded of said plurality of voice messages, stacked sequentially in said digital memory first.

14. A digital voice storage communication system, comprising:
a transmitter for transmitting voice messages at a compressed speech frequency;
a circuit for shifting the frequency of said voice messages above normal speech frequency by a predetermined ratio to a compressed speech frequency;
a code generating circuit for generating code information defining said ratio; a receiver for receiving voice messages comprising:
a receiving circuit for storing voice messages shifted in frequency above normal speech frequency;
a storage device connected to said receiving circuit and storing said voice messages; and
a playback circuit connected to said storage device for shifting the frequency of stored voice messages by the inverse of said ratio while replaying said voice messages.

15. A transmitter for transmitting a plurality of analog voice messages of variable length comprising:
a rate converting circuit for shifting the frequency of each of said analog voice messages to a frequency above normal speech frequency;
a code generating circuit for generating record and replay frequency command codes; and
a transmitting circuit connected to said rate converting circuit, for sequentially transmitting said plurality of frequency shifted analog voice messages, together with said record and replay frequency command codes, in a stacked order.

16. A method for transmitting a plurality of analog voice messages of variable length, comprising the steps of:
shifting the frequency of each of said analog voice messages to a frequency above normal speech frequency;
generating command codes defining the ratio by which said shifting step shifts said frequency; and
transmitting sequentially said plurality of frequency shifted messages together with said command codes in a stacked order.

17. A method of transmitting a communication packet including an address code followed by a voice message, comprising the steps of:
transmitting an address code which identifies at least one receiving station; and
immediately thereafter transmitting said voice message without pausing for a response of any kind from a user.

18. A control terminal for forwarding a plurality of analog voice messages of variable length, comprising:
a control circuit for defining a period for transmission of said plurality of voice messages;
a rate conversion circuit responsive to said control circuit for compressing said analog voice messages within said period; and
a code generating circuit coupled to said rate conversion circuitry for generating record and replay rate code information corresponding to said compressed analog voice messages.

19. A method for transmitting a communication packet including an address code, an end of message code and an analog voice message of variable length to at least one remote receiver having a predetermined address, comprising the steps of:
transmitting said address code; and
transmitting said end of message code prior to transmitting said analog voice message.

20. A method of receiving a communication packet including an address code, an end of message code and an analog voice message of variable length, comprising the steps of:
receiving said address code and said end of message code;
activating a record command and a stop timer prior to receiving said analog voice message;
recording said analog voice message in a storage device responsive to said record command; and
terminating said recording step in response to said stop timer.

* * * * *

UNITED STATES PATENT AND TRADEMARK OFFICE
CERTIFICATE OF CORRECTION

PATENT NO. : 4,864,301

DATED : September 5, 1989

INVENTOR(S) : Richard J. Helferich

Page 1 of 3

It is certified that error appears in the above-identified patent and that said Letters Patent is hereby corrected as shown below:

Title page:

IN THE ABSTRACT:

At line 6, change "componant" to --component--.

At line 8, change "along" to --analog--.

At line 19, change "conponent" to --component--.

At Column 1, line 58, delete "and the".

At Column 2, line 7, change "speech" to --speed--.

At Column 2, line 9, change "transmitter" to --transmission--.

Figure 3:
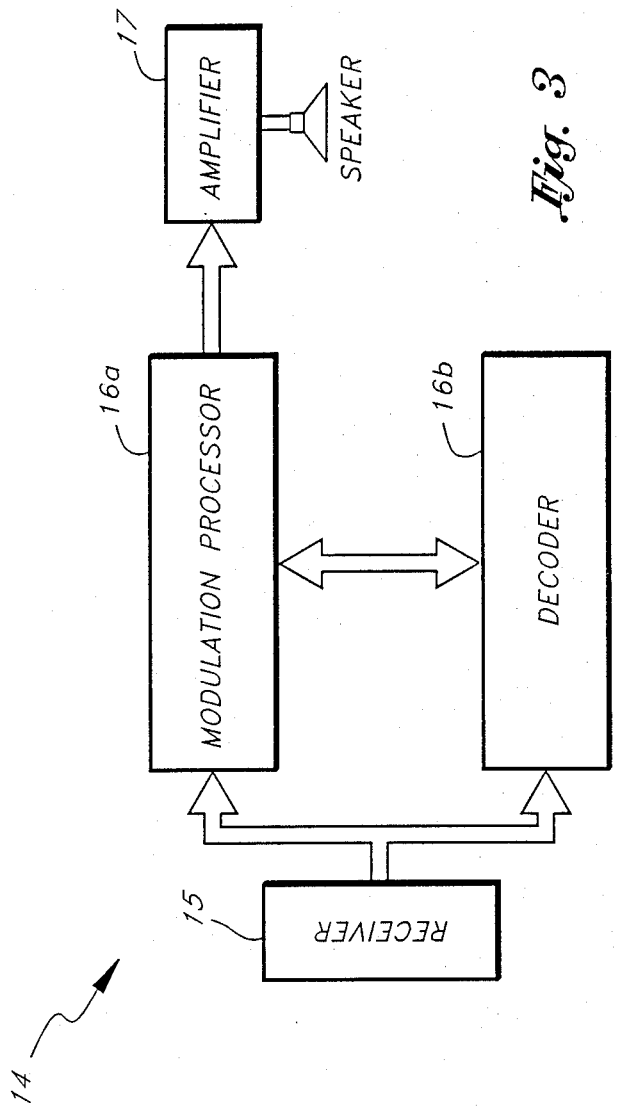
FIG. 3 block diagram of the receiver group in accordance with the present invention.

At Column 2, line 32, after "FIG. 3" insert --is a--.

At Column 2, line 34, after "FIG. 4" insert --is a--.

At Column 2, line 35, before "utilized" insert --circuitry--.

At Column 3, line 58, change "I6b" to --16b--.

At Column 3, line 59, change "record play" to --record/play--.

At Column 3, line 61, change "record play" to --record/play--.

At Column 3, line 66, before "playback" insert --stored--.

At Column 4, line 30, after "FIGS. 2" insert --,3--.

At Column 4, line 31, before "used" insert --be--.

At Column 4, line 49, change "controI" to --control--.

At Column 5, line 52, change "consisting" to --consists--.

At Column 5, line 58, after "enables the" insert --system to--.

At Column 6, line 15, after "70 is" insert --high--.

UNITED STATES PATENT AND TRADEMARK OFFICE
CERTIFICATE OF CORRECTION

PATENT NO. : 4,864,301

DATED : September 5, 1989

INVENTOR(S) : Richard J. Helferich

It is certified that error appears in the above-identified patent and that said Letters Patent is hereby corrected as shown below:

At Column 6, line 17, change "PBS" to --BPS--.

At Column 6, lines 32-40, delete the entire paragraph.

At Column 6, line 47, delete "are".

At Column 6, line 48, delete the word "and".

At Column 7, line 9, change "ad" to --and--.

At Column 7, lines 41-68, delete "In its standby configuration . . . . conversion and storage".

At Column 8, line 16, change "coup-led" to --coupled--.

At Column 8, line 21, change "FIGS." to --FIG.--.

At Column 9, line 41, change "maybe" to --may be--.

Claim 7, at Column 10, line 63, change "communication" to --communicating--.

Claim 10, at Column 11, lines 13-14, change "in a stacked, sequential order." to --, said control terminal forwarding said communication packets in queue.--.

Claim 11, at Column 11, line 17, after "station" insert --sequentially--.

Claim 11, at Column 11, line 19, delete "in a packed, sequential order".

Claim 12, at Column 11, lines 24-25, change "stacked sequentially" to --stored--.

UNITED STATES PATENT AND TRADEMARK OFFICE
CERTIFICATE OF CORRECTION

PATENT NO. : 4,864,301
DATED : September 5, 1989
INVENTOR(S) : Richard J. Helferich It is certified that error appears in the above-identified patent and that said Letters Patent is hereby corrected as shown below:

Claim 13, at Column 11, line 29, change "stacked sequentially" to --stored--.

Claim 15, at Column 12, line 5, delete "in a stacked order".

Claim 16, at Column 12, line 16, delete "in a stacked order".

Signed and Sealed this

Sixteenth Day of April, 1991

Attest:

HARRY F. MANBECK, JR.

Attesting Officer

Commissioner of Patents and Trademarks